(12) United States Patent
Ueno

(10) Patent No.: US 7,474,622 B2
(45) Date of Patent: Jan. 6, 2009

(54) RESET CIRCUIT AND RESET METHOD

(75) Inventor: Tsukasa Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 597 days.

(21) Appl. No.: 11/029,002

(22) Filed: Jan. 5, 2005

(65) Prior Publication Data
US 2005/0152443 A1 Jul. 14, 2005

(30) Foreign Application Priority Data
Jan. 14, 2004 (JP) ............................. 2004-006454

(51) Int. Cl.
*H04J 1/16* (2006.01)
(52) U.S. Cl. ...................... 370/242; 370/248
(58) Field of Classification Search ................ None
See application file for complete search history.

(56) References Cited

U.S. PATENT DOCUMENTS

| 5,086,452 A * | 2/1992 | Ito et al. ..................... 455/561 |
| 5,281,955 A * | 1/1994 | Reich et al. ............ 340/636.12 |
| 5,323,066 A * | 6/1994 | Feddeler et al. ............. 327/142 |
| 5,712,967 A * | 1/1998 | Grossman et al. .............. 714/3 |
| 5,732,125 A * | 3/1998 | Oyama .................... 455/404.1 |
| 5,805,791 A * | 9/1998 | Grossman et al. ............. 714/23 |
| 5,896,423 A * | 4/1999 | Okamoto .................... 375/345 |
| 6,150,922 A * | 11/2000 | Ackland et al. ......... 340/286.01 |
| 6,724,731 B1 | 4/2004 | Shibasaki et al. |
| 7,142,404 B1 * | 11/2006 | Bikulcius et al. ............. 340/635 |
| 2001/0018350 A1 * | 8/2001 | Hachimura et al. ......... 455/462 |
| 2003/0043771 A1 * | 3/2003 | Mizutani et al. ............. 370/338 |
| 2003/0154421 A1 | 8/2003 | Abe et al. |
| 2004/0142803 A1 * | 7/2004 | Fitzgibbon .................... 483/9 |
| 2004/0153215 A1 * | 8/2004 | Kearney et al. ............. 700/293 |
| 2006/0063544 A1 * | 3/2006 | Zhao et al. ................... 455/510 |

FOREIGN PATENT DOCUMENTS

| GB | 2 326 313 | 12/1998 |
| JP | 62-261254 | 11/1987 |
| JP | 10-11324 | 1/1998 |
| JP | 10-078896 | 3/1998 |
| JP | 2000-276260 | 10/2000 |
| JP | 2003-248599 A | 9/2008 |
| WO | WO 03/051082 | 6/2003 |

* cited by examiner

Primary Examiner—Andrew Lee
(74) Attorney, Agent, or Firm—Foley & Lardner LLP

(57) ABSTRACT

A reset circuit and a reset method are provided in order to operate a power switch of the main body of a communication device installed in an inaccessible place such as a remote place or a high-altitude place and to execute a reset by software in the case of having problems with firmware or software of a communication device installed in a remote place. In a reset circuit for a communication device, the device is reset by using link information, which indicates whether a physical layer is connected or disconnected to an external interface.

14 Claims, 3 Drawing Sheets

F I G. 5
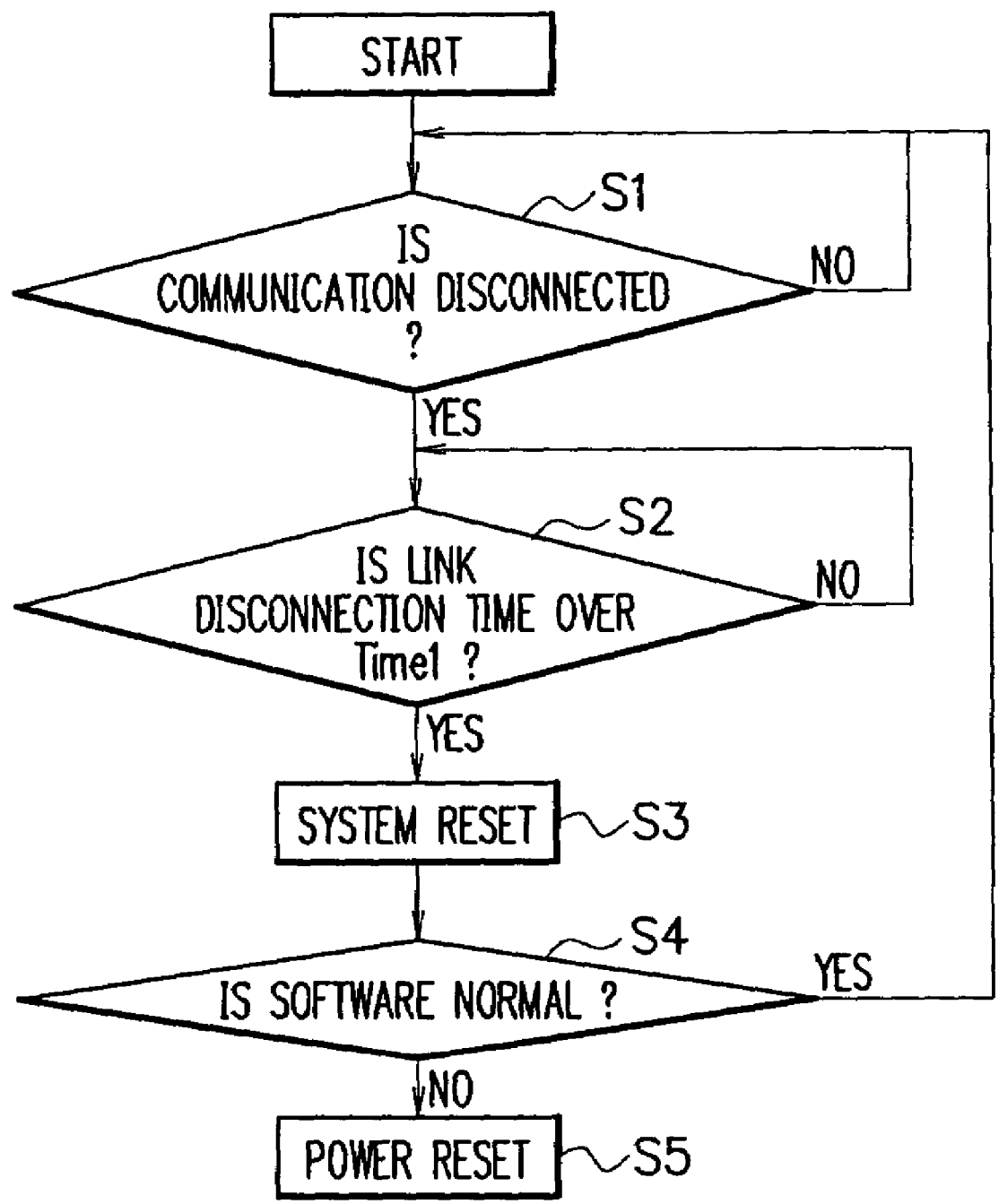

RESET CIRCUIT AND RESET METHOD

BACKGROUND OF THE INVENTION

1. Field of the Invention

The present invention relates to a reset circuit and a reset method. Especially, the present invention relates to a reset circuit and a reset method for a communication device installed in an inaccessible place such as a remote place or a dangerous place like a high-altitude place.

2. Description of the Prior Art

Generally, for example, a reset circuit is applied to a communication processing circuit. FIG. 1 is a diagram showing a conventional reset circuit. Referring to FIG. 1, a communication processing circuit 13 is reset by a reset circuit 12. For resetting, software reset by a switch, software reset by software, power reset by a switch and the like are employed. The communication processing circuit 13 is reset by a system reset pulse 4 and a power reset pulse 6 output from the reset circuit 12.

The prior art described above is disclosed in the Japanese Patent application laid open No. 2000-276260 and in the Japanese Patent application laid open No. 10-11324.

The conventional reset circuit and the reset method have problems as below.

The first problem is that, in a communication device installed in an inaccessible place such as a remote place or a dangerous place like a high-altitude place where it is difficult to visit, it is difficult to operate the power switch of the main body of the device.

The second problem is that, in a communication device remotely installed, resetting by pressing a switch or resetting by software is impossible when there are problems with firmware or software.

Generally, for resetting a communication device, a switch or a multiplexed control signal has been used for resetting a power source or a system. Especially, in a communication device remotely installed, a power switch cannot be easily operated and the control signal cannot be used for resetting when there are problems with firmware or software of a communication device.

SUMMARY OF THE INVENTION

It is therefore an object of the present invention to provide a remote installed communication device with a reset circuit and a reset method for easily operating a system reset or a power reset from distant place.

The present invention, in a reset circuit for a communication device, wherein the device is reset by using link information, from an external interface signal, which indicates whether an external interface is connected or disconnected to a physical layer.

The present invention, in a reset circuit for a communication device, resets a device by judging whether or not a communication is disconnected based on the link information input from an interface circuit connected to an external interface.

It is desirable that the reset circuit have a reset function for judging, based on the link information input by an interface circuit connected to an external interface, whether a communication is connected or disconnected and resetting the communication device if the communication judged to be disconnected. It is desirable that the reset circuit comprise: a link disconnection judging circuit for judging whether or not link is disconnected based on the link information; a system reset circuit for resetting system based on a reset signal from the link disconnection judging circuit; and a power reset circuit for a power disconnection based on a reset signal from the link disconnection judging circuit.

A reset method for a communication device in accordance with the present invention, comprises the steps of judging whether or not a communication is disconnected based on link information which indicates whether a physical layer is connected or disconnected to an external interface; measuring the time from when a communication is judged to be disconnected by the judging step; resetting system when the time measured in the previous step is over the first predetermined time; and/or resetting power when the measured time is over the second predetermined time. Or otherwise, a reset method for a communication device in accordance with the present invention comprises the steps of judging whether or not a communication is disconnected based on link information which indicates whether a physical layer is connected or disconnected to an external interface; measuring the time from when a communication is judged to be disconnected by the judging step; resetting system when the measured time in the previous step is over the first predetermined time; judging whether or not the system up and running correctly after the resetting step; resetting power when the system is not judged to be correctly up and running by the previous step.

It is desirable that the first and the second predetermined times be reconfigured after once having been configured.

In the present invention, a link disconnection judging circuit judges, based on link information input by an interface circuit, whether or not a communication is disconnected. In the previous judgement, when a communication is judged to be disconnected, the link disconnection judging circuit outputs system reset pulse to a system reset circuit and a power reset pulse to a power disconnection circuit, respectively. The system reset circuit, in the case of disconnection of communication, sends reset signals to each section of the device. The power disconnection circuit, based on the reset pulse, stops supplying second power to each section of the device. According to the structure described above, the present invention provides a reset circuit and a reset method for especially a communication device remotely installed.

BRIEF DESCRIPTION OF THE DRAWINGS

The above and further objects and novel features of the invention will be more fully understood from the following detailed description when the same is read in connection with the accompanying drawings in which:

FIG. 5 is a flowchart showing an example of a resetting method of the present invention.

DETAILED DESCRIPTION OF THE PREFERRED EMBODIMENTS

Figure 1:
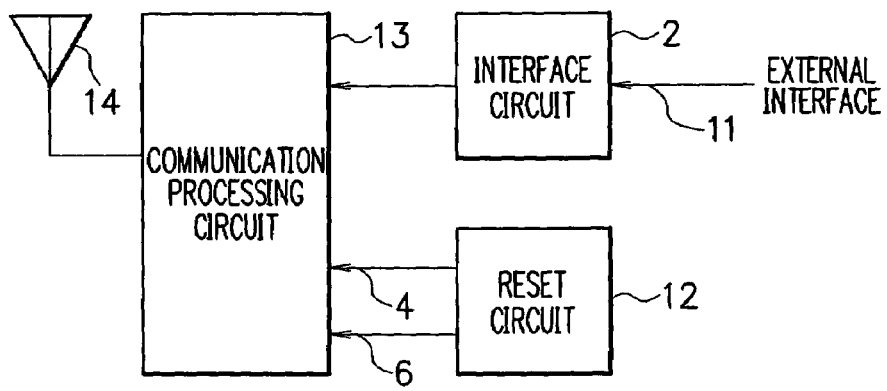
FIG. 1 is a block diagram showing a communication device having a conventional reset circuit.

Referring now to the drawings, a description of preferred embodiments of the present invention will be given in detail.

Figure 2:
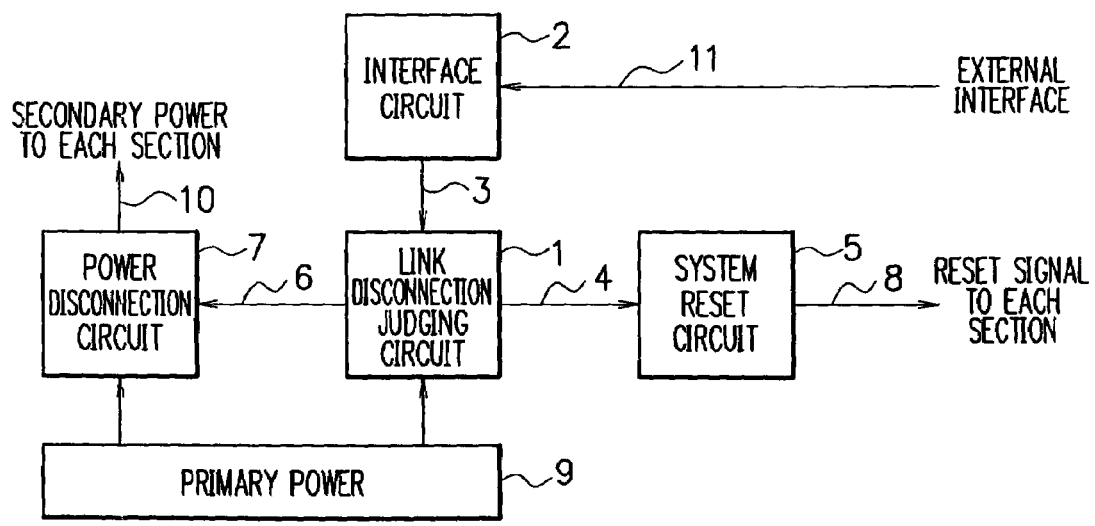
FIG. 2 is a block diagram showing the structure of a principal part including a reset circuit of the present invention.

FIG. 2 is a diagram showing the structure of a reset circuit of the present invention. Referring to FIG. 2, a link disconnection judging circuit 1 judges, based on link information 3 input by an interface circuit 2, whether or not a communication is disconnected. In the previous judgement, when a communication is judged to be disconnected, the link disconnection judging circuit 1 outputs a system reset pulse 4 to a system reset circuit 5 and a power reset pulse 6 to a power disconnection circuit 7, respectively. The system reset circuit 5 sends a reset signal 8 to each section of the device. The power disconnection circuit 7, based on the power reset pulse 6, stops supplying a secondary power 10 to each section of the device.

In the structure described above, the present invention provides a reset circuit and a reset method, based on the link information 3 input by the interface circuit 2, for judging whether or not a communication is disconnected. According to the present invention, in a communication device remotely installed, even in the case of neither being able to be operated easily by a power switch of the main body of a device nor being able to be reset by pressing a switch or by software when there are problems with firmware or software, a system reset or a power reset of a device is surely operated by link disconnected state (stopping inputting an external interface signal) of an external interface signal.

Figure 3:
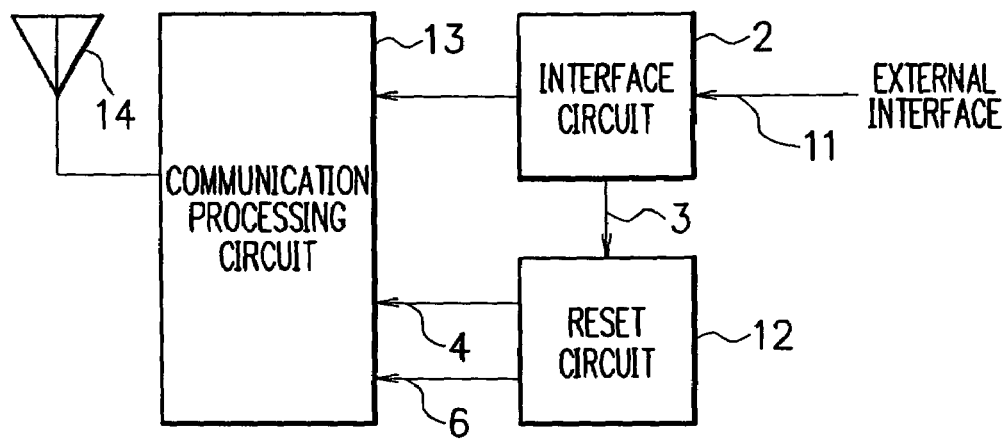
FIG. 3 is a block diagram showing a communication processing circuit including a reset circuit of the present invention.

FIG. 3 shows the structure of a radio communication device employing a reset circuit according to the first embodiment. As shown in FIGS. 2 and 3, a reset circuit 12 in accordance with the present invention comprises the link disconnection judging circuit 1, the system reset circuit 5 and a power disconnection circuit (power reset circuit) 7. According to the present invention, a communication processing circuit 13 may comprise the system reset circuit 5 and the power disconnection circuit (power reset circuit) 7 to form a reset circuit of the present invention.

Referring to FIG. 3, an interface circuit 2 terminates an interface 11. An ethernet® or an optical interface, for example, may serve as an external interface, but the external interface is not limited to them unless departing from the spirit and the scope of the present invention. The interface 2 is a terminal section for an ethernet® or an optical interface. Signals output by the interface circuit 2 are sent to the communication processing circuit 13 in which modulation or demodulation is conducted and are output from an antenna 14.

The interface circuit 2 is comprised of a dead end of a physical layer and that of a MAC (Media Access Control) layer of IEEE 802.11. The dead end of the physical layer establishes a connection (link) without interventions such as a control by a CPU (Central Processing Unit). The signal indicating the state of the link is the link information 3.

FIG. 2 shows the structure of a reset circuit in this embodiment. In FIG. 2, the link disconnection judging circuit 1 judges, based on the link information 3 input by the interface circuit 2, whether or not communication is disconnected. In the previous judgement, when a communication is judged to be disconnected, the link disconnection judging circuit 1 outputs the system reset pulse 4 to the system reset circuit 5 and the power reset pulse 6 to the power disconnection circuit 7, respectively.

In the system reset circuit 5, the system reset pulse 4 is input from the link disconnection judging circuit 1 to produce the reset signal 8 for resetting each section of the device. In the power disconnection circuit 7, the power reset pulse 6 is input from the link disconnection judging circuit 1 to stop supplying the secondary power 10.

As set forth hereinbefore described is the structure and operation of a circuit of the present invention. Since the interface circuit 2 and the communication processing circuit 13 in FIG. 3 are well known to those skilled in the art and are not directly concerned to the present invention, the detailed structures of them are left out.

Next, a description will be given of the operation of the reset circuit shown in FIG. 2 referring to the time chart shown in FIG. 4.

In FIG. 3, the link disconnection judging circuit 1 judges whether or not the communication is disconnected. As shown in FIG. 4, the level "H" indicates that the link is made, and the level "L" indicates that the link is not made.

In the link disconnection judging circuit 1, the system reset pulse 4 is output at the moment where the period of time has passed from when the link information became "L" level from the "H" level until it lasts for Time 1. At the moment where the period of time has passed from when the link information became "L" level from "H" level until it lasts for Time 2, the power reset pulse 6 is output. As shown in the time chart in FIG. 4, Time 1 is a predetermined time for resetting a system and Time 2 is a predetermined time for resetting a power source. It is agreeable that Time 2 is longer than Time 1, but it is not limited to that. For instance, Time 1 may be longer than Time 2. Further, for example, before/after a period of time (one month, three months, six months or one year for example), it is possible to change a relation between Time 1 and Time 2 from Time 2>Time 1 to Time 2<Time 1, and it may be reconfigured that Time 2 is longer than Time 1 after a power reset. With this operation, for example, it is possible to prevent, by the periodical resetting a timed destruction of software caused by viruses or a sudden freeze caused by bugs. Installations of these operations are described in the following embodiment.

As shown in FIG. 5, the link disconnection judging circuit 1 judges whether or not the communication is disconnected based on the link information (step S1).

When the communication is judged to be disconnected in the link disconnection judging circuit 1, a disconnected time is measured from when the communication is disconnected and the disconnected time is monitored if it gets to be longer than Time 1.

In the step S2, in the case of Yes, a reset pulse is output for resetting the system (step S3).

Figure 4:
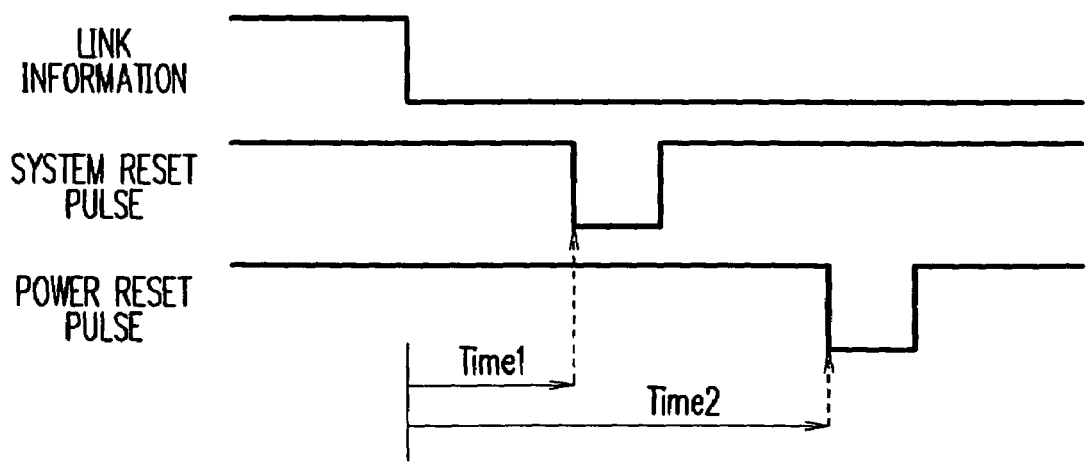
FIG. 4 is a timing chart according to the embodiment of the present invention.

In the present invention, as shown in FIG. 4, it is possible to reset the system when the disconnected time comes to Time 1, and reset the power when the disconnected time comes to Time 2. Further, as shown in FIG. 5, when Time 2 is longer than Time 1, for example, after the system reset (step S3), the communication processing circuit detects if troubles such as freezing are swept away (step S4). When the system is judged to be abnormal (step S4, No), the power source may be reset (step S5).

Referring to FIG. 2, the system reset circuit 5 resets the system by transmitting the reset signal 8 to each section of the device based on the system reset pulse 4. The power disconnection circuit 7 resets the power source by stopping supplying the secondary power 10 to each section of the device based on the power reset pulse 6.

With this operation, a disconnected time is decided by disconnecting a cable of an ethernet® on the opposite side of its radio device for a while or by stopping outputs from an optical cable on the opposite side of its radio device. Depending on the length of the disconnected time of the operation described above, it is possible to reset the system of device or the power.

As a result, it is possible to easily reset a device that cannot be power reset by turning off its power switch, or system reset by software because of its trouble.

A description will be given of another embodiment of the present invention of which the structure is the same as the embodiment described above, but is further characterized by timer setting. In this structure, the timer setting for a system reset and a power reset can be changed programmatically. In this case, after being installed and used, the reset condition can be changed.

For example, it is possible to decide with software the configuration of link disconnection to each external device at respective external devices by storing the history of the link disconnection. Accordingly, a plurality of values of Time 1 (system resetting time) can be configured on software or firmware. Further, the values of Time 1 (system resetting time) for respective external devices can be configured based on each history of link disconnection on software or firmware. For example, it is possible to reconfigure Time 1 as Time $1_n$, where Time $1_n$ is an average of Time 1, under the condition:

$$\frac{\text{Time } 1_n - \text{Time } 1}{\sigma 1/n^{1/2}} > K$$

where n indicates the number of disconnections, $\sigma 1$ indicates the standard deviation of a system resetting time, and K indicates a predetermined time. Further, as described in the first embodiment, the periodical resetting by a power switch can be made by changing the length of Time 1 and Time 2. As described above, it is possible to reconfigure Time 1 as Time $1_n$, and then use Time $1_n$ and Time 2 respectively, in the same way as the first embodiment.

The present invention allows for resetting from a distant place a communication device remotely installed because the structure enables a system to be reset by link disconnection of an external interface. Accordingly, it is also possible to execute a reset from a distant place by using the link disconnection of an external interface even if a communication device has problems with firmware or software. Further, an agreeable resetting method can be chosen at respective devices because the employment of a system reset and a power reset can be chosen depending on the length of the time of the link disconnection.

While preferred embodiments of the invention have been described using specific terms, the description has been for illustrative purpose only, and it is to be understood that changes and variations may be made without departing from the spirit or scope of the following claims.

What is claimed is:

1. A reset circuit for a communication device,
   wherein the reset circuit is configured to reset the device by using link information which indicates whether a physical layer is connected or disconnected to an external interface, and
   wherein the reset circuit comprises:
      a link disconnection judging circuit for judging whether the physical layer is disconnected based on the link information input from an interface circuit comprising the physical layer;
      a system reset circuit for resetting the communication device by receiving a reset signal from the link disconnection judging circuit; and
      a power reset circuit for disconnecting a power source by receiving a reset signal from the link disconnection judging circuit.

2. The reset circuit claimed in claim 1, wherein the reset circuit is configured to receive the link information input from the interface circuit.

3. The reset circuit claimed in claim 2, wherein the external interface is in communication with the communication device via the interface circuit.

4. The reset circuit claimed in claim 1, wherein the communication device is a radio communication device.

5. A resetting method for a communication device comprising the steps of:
   judging whether or not a communication is disconnected based on link information which indicates whether a physical layer is connected or disconnected to an external interface;
   measuring a time from when the communication is judged to be disconnected by the judging step;
   resetting the communication device when the time measured in the previous step is over a first predetermined time;
   and/or resetting a power source when the time measured is over a second predetermined time.

6. The resetting method for a communication device claimed in claim 5, wherein the first and second predetermined times can be reconfigured after the predetermined times have been configured.

7. The resetting method claimed in claim 5, wherein resetting the communication device comprises producing a system reset pulse.

8. The resetting method claimed in claim 7, wherein resetting the communication device further comprises applying a reset signal to each section of the communication device in response to the system reset pulse.

9. The resetting method claimed in claim 8, wherein resetting the power source comprises producing a power reset pulse and stopping a supply of a secondary power to said each section of the communication device in response to the power reset pulse.

10. A resetting method for a communication device comprising the steps of:
    judging whether or not a communication is disconnected based on link information which indicates a physical layer is connected or disconnected to an external interface;
    measuring a time from when the communication is judged to be disconnected by the judging step;
    resetting the communication device when the time measured in the previous step is over a predetermined time;
    judging whether or not the communication device is up and running correctly after the resetting step; and
    resetting a power when the communication device is not judged in the previous step to be correctly up and running.

11. The resetting method for a communication device claimed in claim 10, wherein the predetermined time can be reconfigured after the predetermined time has been configured.

12. The resetting method claimed in claim 10, wherein resetting the communication device comprises producing a system reset pulse.

13. The resetting method claimed in claim 12, wherein resetting the communication device further comprises applying a reset signal to each section of the communication device in response to the system reset pulse.

14. The resetting method claimed in claim 13, wherein resetting the power comprises producing a power reset pulse and stopping a supply of a secondary power to said each section of the communication device in response to the power reset pulse.

* * * * *

UNITED STATES PATENT AND TRADEMARK OFFICE
CERTIFICATE OF CORRECTION

PATENT NO. : 7,474,622 B2  
APPLICATION NO. : 11/029002  
DATED : January 6, 2009  
INVENTOR(S) : Ueno Page 1 of 1

It is certified that error appears in the above-identified patent and that said Letters Patent is hereby corrected as shown below:

On the Title Page

Item [*] Notice: Subject to any disclaimer, the term of this patent is extended or adjusted under 35 USC 154(b) by (562) days Delete the phrase "by 562 days" and insert -- by 929 days --

Signed and Sealed this

Eighth Day of June, 2010

David J. Kappos  
*Director of the United States Patent and Trademark Office*